(12) United States Patent
Muñoz et al.

(10) Patent No.: US 6,398,091 B1
(45) Date of Patent: Jun. 4, 2002

(54) VEHICLE ARTICLE CARRIER AND BICYCLE RACK

(75) Inventors: Donald L. Muñoz, Bloomfield Hills; Gerard J. Kmita, Allen Park; David D. Egly, Ferndale, all of MI (US)

(73) Assignee: JAC Products, Inc., Ann Arbor, MI (US)

( * ) Notice: Subject to any disclaimer, the term of this patent is extended or adjusted under 35 U.S.C. 154(b) by 21 days.

(21) Appl. No.: 09/695,379

(22) Filed: Oct. 24, 2000

Related U.S. Application Data

(60) Provisional application No. 60/162,523, filed on Oct. 29, 1999.

(51) Int. Cl.[7] .................................................. B60R 9/00
(52) U.S. Cl. ..................... 224/402; 224/403; 224/405
(58) Field of Search ................................ 224/402, 403, 224/405, 309, 310, 42.26, 42.28, 42.29; 414/462; 296/3

(56) References Cited

U.S. PATENT DOCUMENTS 3,343,696 A * 9/1967 Morrison .................... 414/462
5,924,835 A * 7/1999 Ross .......................... 224/402
6,179,181 B1   1/2001 Johnson et al.

* cited by examiner

Primary Examiner—Gregory M. Vidovich
Assistant Examiner—Maerena W. Brevard
(74) Attorney, Agent, or Firm—Harness, Dickey & Pierce, PLC

(57) ABSTRACT

A vehicle article carrier specifically adapted for use with a pickup truck. The article carrier includes a pair of elongated roof rails adapted to be fixedly secured to an outer body surface of the vehicle. Each roof rail has a first portion having a length adapted to extend over the roof of a cab portion of the vehicle, and a second portion adapted to extend down along the rear of the cab portion. A cross member is secured between the second portions of the roof rails. At least one clamping assembly is included which can be clamped to the cross member. The clamping assembly has a pair of posts which are adapted to support the outermost ends of the tines of the front fork of a bicycle once the front wheel of the bicycle is removed. The bicycle can thus be supported in an upright position within the bed of the pickup truck without external fastening cords. The vehicle article carrier further does not take up any appreciable cargo space within the bed area when it is not in use.

21 Claims, 3 Drawing Sheets

_US 6,398,091 B1_

VEHICLE ARTICLE CARRIER AND BICYCLE RACK

This application claims the benefit of provisional application 60/162,523 filed Oct. 29, 1999.

TECHNICAL FIELD

This invention relates to article carrier systems, and more particularly to a vehicle article carrier adapted specifically for use with a pickup truck and capable of supporting one or more bicycles in an upright orientation within a bed of the pickup truck.

BACKGROUND OF THE INVENTION

Vehicle article carriers are used on a wide variety of vehicles to support articles thereon above an outer body surface of the vehicle. Most commonly, such vehicle article carriers comprise a pair of elongated rails, sometimes termed "slats", fixedly mounted on a roof of the vehicle with one or more cross bars being secured to the rails. The cross bars may be fixedly secured to the rails or adjustably secured to allow the user to vary the position of one or both of the cross bars.

With pickup trucks, vehicle article carriers have traditionally not been employed. This is because such vehicles have very short roofs, as compared with most other vehicles such as sport utility vehicles, station wagons and even sedans. However, the large bed of a pickup truck makes the truck ideally suited for carrying bicycles and a variety of other cargo items. Even when carrying bicycles in the bed of a pickup truck, however, the user must still tie or otherwise secure the bicycle with external straps or some other means to hold the bicycle securely within the truck bed. This is because no structure is present in the truck bed which is specifically adapted to support one or more bicycles during transportation thereof. However, it is often inconvenient and/or time consuming to have to use one or more straps to secure the bicycle within the truck bed, and also time consuming to release the bicycle when it is to be removed from the truck bed.

Accordingly, it is a principal object of the present invention to provide a vehicle article carrier which is specifically adapted for use with a pickup truck to support articles thereon.

It is a further object of the present invention to provide a vehicle article carrier which is specifically adapted for use with a pickup truck, and which includes structure for conveniently supporting one or more bicycles in an upright orientation within the truck bed of the pickup truck without the need for external straps and other like components.

It is still another object of the present invention to provide a vehicle article carrier which is specifically adapted for use with a pickup truck, and which is capable of supporting one or more bicycles within the bed of thereof, in an upright orientation, and which further does not interfere with the use of the bed of the pickup truck or take up valuable space therein when it is not in use.

SUMMARY OF THE INVENTION

The above and other objects are provided by a vehicle article carrier in accordance with preferred embodiments of the present invention. The preferred embodiments are specifically adapted for use with a pickup truck and provide a means by which one or more bicycles can be supported in an upright orientation within the bed of the pickup truck without the use of bungee cords or other like securing cords.

In one preferred embodiment the vehicle article carrier comprises a pair of roof rails which have a first portion adapted to extend over the roof of a pickup truck and a second portion adapted to extend down over the back wall of the cab portion of the pickup truck. A lower cross member extends between the second portions of the roof rails adjacent the rear window of the cab of the vehicle. One or more clamping assemblies each adapted to be secured to the cross member are provided which each have fork engaging portions. The fork engaging portions are able to releasably attach to the tines of a fork of a bicycle once the front wheel thereof is removed. The fork engaging portions support the bicycle in a secure, upright position within the bed of the pickup truck and also allow the bicycle to be quickly and easily removed when needed. This is accomplished without the need for any external tools.

In the preferred embodiments the clamping assemblies are capable of being adjustably positioned along the cross member. In this manner, the clamping assemblies can be optimally positioned on the cross member depending upon the number of bicycles that are being transported. Optionally, one or more cross bars could be positioned on the first portions of the roof rails to support articles above the 20 outer body surface of the cab portion of the vehicle. The preferred embodiments of the present invention allow one or more bicycles to be quickly and easily fastened thereto for convenient transport within the bed of a pickup truck. Importantly, the present invention does not take up significant valuable cargo space within the truck bed when it is not in use. It also permits articles to be transported above the cab in the more traditional manner if one or more cross bars are incorporated.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
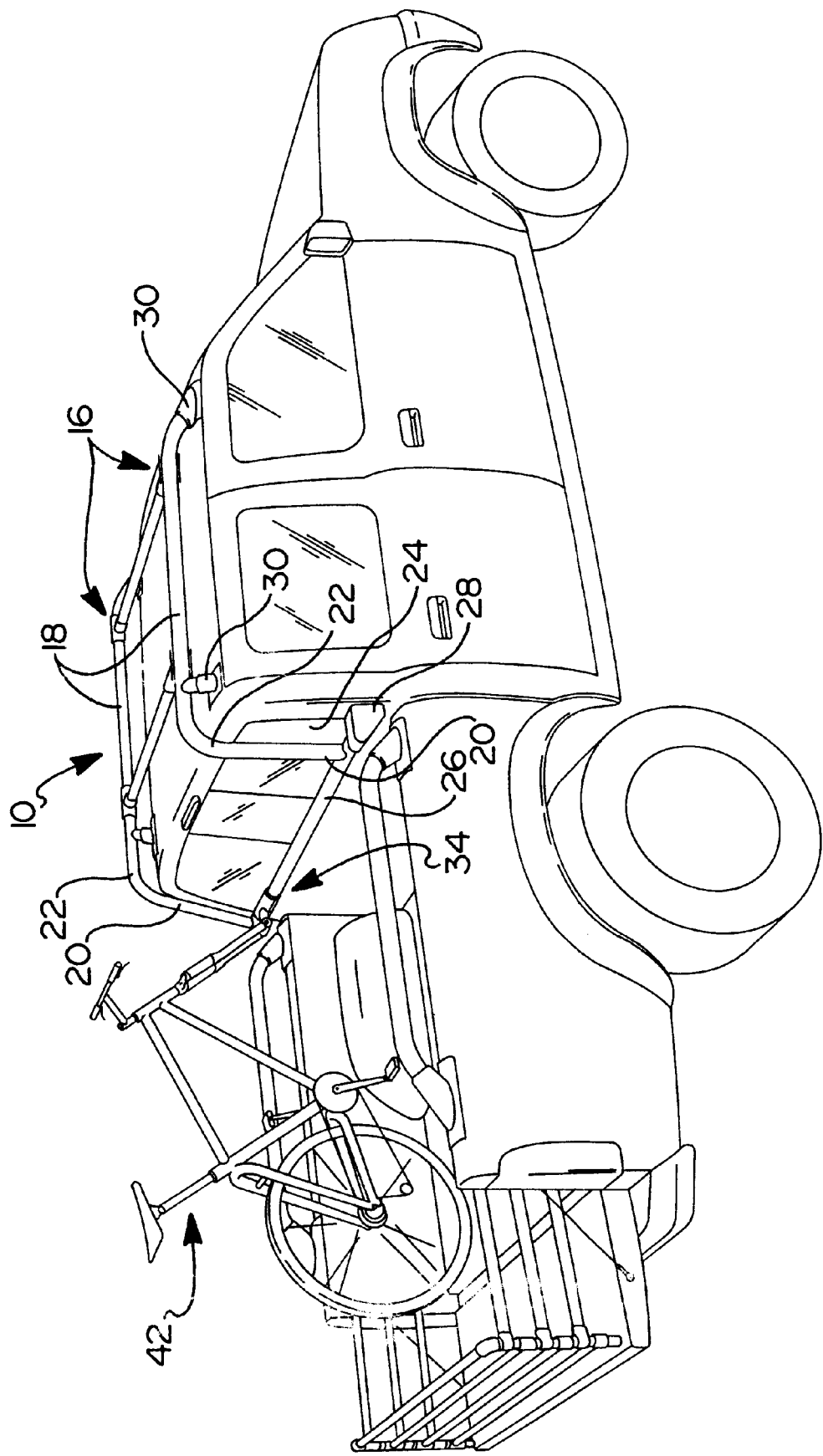
FIG. 1 is a perspective view of a vehicle article carrier in accordance with a preferred embodiment of the present invention being used to support a bicycle within a truck bed of a pickup truck.
Figure 2:
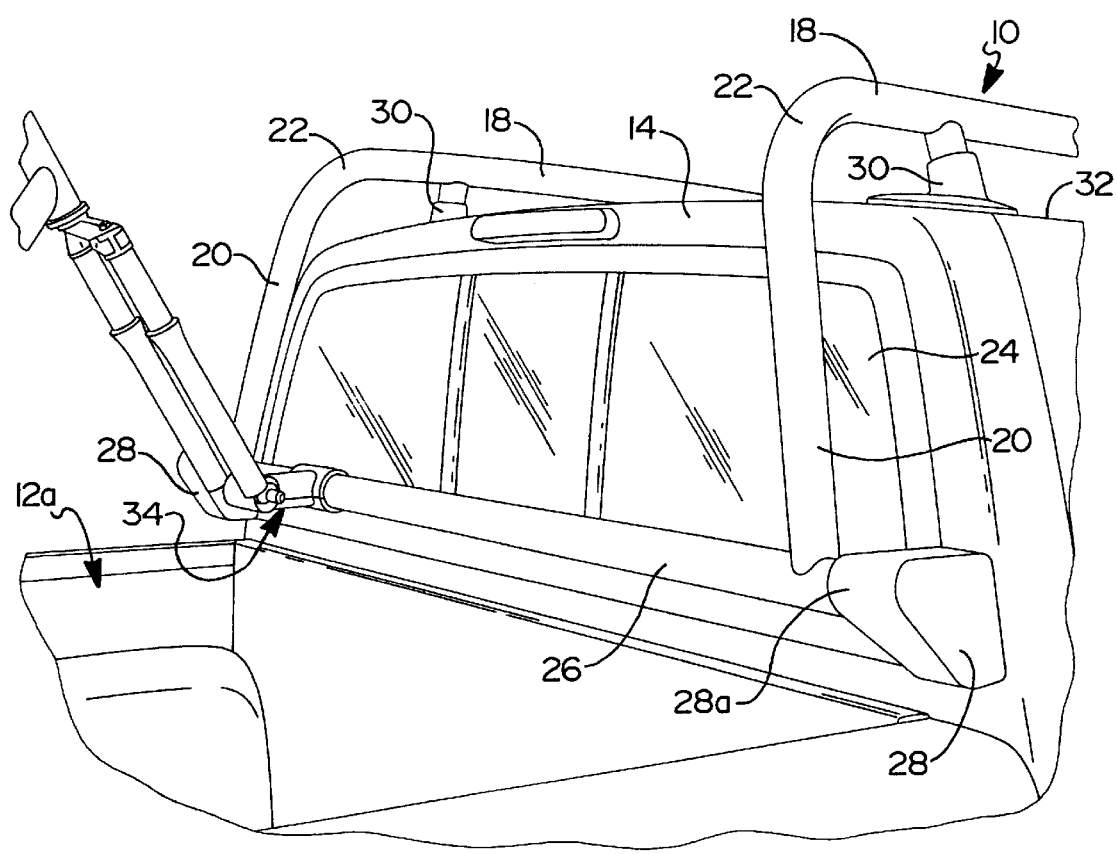
FIG. 2 is a perspective view of a portion of the vehicle article carrier shown in FIG. 1 supporting a single bicycle in an upright orientation.

Referring to FIGS. 1 and 2, there is shown a vehicle article carrier 10 in accordance with a preferred embodiment of the present invention secured to a pickup truck 12. As will be appreciated from the following paragraphs, the article carrier 10 is specifically adapted for use with the cab portion 14 of a pickup truck.

The article carrier 10 includes a pair of roof rails 16 having elongated first portions 18 and second portions 20, preferably formed from a single tubular member. Portions 18 and 20 are joined by gradually curving portions 22. Portions 20 extend generally perpendicular to portions 18. Portions 18 are slightly shorter than the length of the roof of the cab portion 14, and portions 20 extend preferably down to a point near or adjacent to the lower edge of a rear window 24 of the pickup truck 12. A cross member 26 extends between the second portions 20 of the roof rails 16 and is preferably fixedly secured to the second portions 20 such as by welding or brazing. It will be appreciated, however, that conventional threaded nut and bolt type securing assemblies could be used to secure the cross member 26 to the second portions of the roof rails 16 if desired.

The opposite ends of the cross member 26 are supported by mounting supports 28 secured directly to the cab portion 14 on opposite sides of the rear window 24. The mounting supports 28 have tubular portions 28a which receive end portions of the cross member 26 therein. External fastening elements (not shown) such as threaded screws may be used to secure each mounting support 28 to the outer body surface of the cab portion 14 adjacent the rear window 24. Additional mounting supports 30 are used to support the first portions 18 on the cab portion 14, and can also be fixedly secured to roof portion 32 of the vehicle 12 by external fastening elements such as described above.

Figure 3:
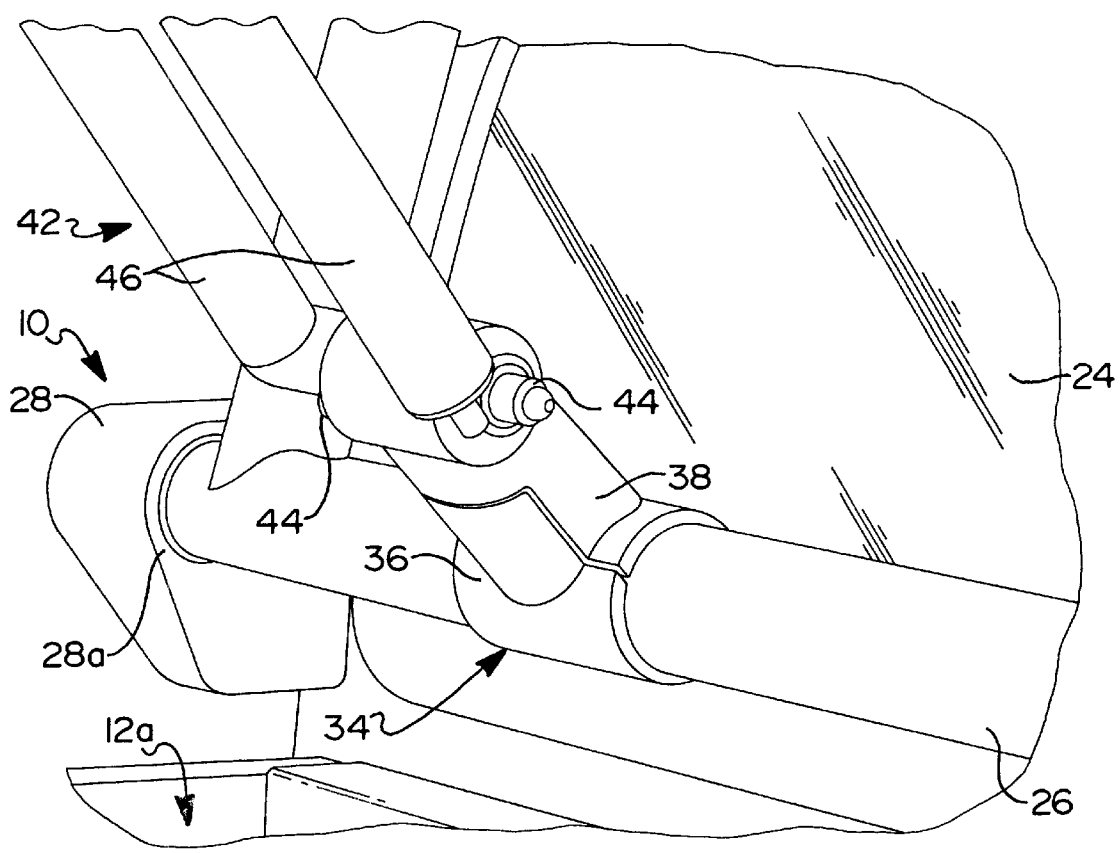
FIG. 3 is a perspective view of one of the clamping assemblies of the present invention being used to support the fork of a bicycle thereon.

Referring now to FIGS. 2 and 3, the article carrier 10 can further be seen to include at least one clamping assembly 34 which is clamped to the cross member 26. The clamping assembly comprises a pair of jaws 36 and 38 which are adapted to grasp and be clamped to the cross member 26 by a threaded element 40. Threaded element 40 extends through an aperture in jaw 36 and into a threaded bore in jaw 38. The clamping assembly 34 can be adjustably positioned along the cross member 26 and tightened onto the cross member 26 at a desired position. This provides for maximum flexibility in positioning other cargo within a truck bed 12a when only one bicycle 42 is to be transported, while still allowing optimal positioning of a plurality of clamping assemblies 34 when several bicycles 42 are being transported.

The clamping assembly 34 further includes a pair of posts 44 which are adapted to receive the outermost ends of tines 46 of a fork 48 of the bicycle 42. Posts 44 may be partially or completely threaded such that threaded bolts 50 can be used to secure the fork 48 thereon. Once secured by its fork 48 to the clamping assembly 34, the bicycle 42 is securely held in an upright position within the bed 12a of the vehicle 12. The posts may be inserted into a bore in the jaw 38 or possibly even integrally formed with the jaw 28 during its manufacture.

A bicycle 42 is secured to the article carrier 10 by first positioning one of the clamping assemblies 34 at the desired longitudinal position along the cross member 26 and then tightening it via the threaded element 40. The front wheel of the bicycle is then removed and the outermost ends of tines 46 are positioned on the posts 44. External threaded nuts can then be used to secure the tines 46 to the posts 44. It will also be appreciated that a clamping mechanism could be incorporated for use with the posts 44 such that the outermost ends of the tines 46 can be clamped onto the posts 44 simply by movement of a lever from a release position to a clamped position. Such structure is well known in the art. Once secured, the bicycle 42 will be held in an upright position with its front fork slightly elevated.

A principal advantage of the article carrier 10 of the present invention is that the article carrier does not take up any appreciable space within the bed 12a of the vehicle 12 when not in use. The article carrier 10 further maintains one or more bicycles 42 each in an upright position without the use of stretchable or non-stretchable straps. Even with one or more bicycles 42 secured to the article carrier 10, the view out of the rear window of the vehicle is not completely impeded.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An article carrier adapted for use with a pickup truck, comprising:
    a pair of roof rails adapted to be fixedly secured to a roof of a cab portion of said pickup truck, each of said roof rails having a first portion and a second portion, said first portion having a length sufficient to extend over at least a portion of the roof of the cab portion of said pickup truck, said second portion extending generally downwardly toward a bed of said pickup truck;
    a cross bar secured generally perpendicularly between said second portions at a position vertically below said roof of said cab portion, for supporting portions of cargo; and
    at least one securing assembly supported on said cross bar for securing said cargo to said cross bar.

2. The article carrier of claim 1, wherein said second portion extends generally perpendicularly from said first portion.

3. The article carrier of claim 1, wherein said securing assembly comprises a clamping portion adapted to be clamped to said cross bar.

4. The article carrier of claim 1, wherein said securing assembly comprises a clamping portion adapted to be clamped to said cross bar, and at least one support portion adapted to be releasably secured to said cargo.

5. The article carrier of claim 1, wherein said support portion comprises a pair of support parts adapted to engage a pair of tires of a form of a bicycle.

6. The article carrier of claim 1, wherein each of said first and second roof rails comprises a single piece component.

7. An article carrier for use with a pickup truck having a cab, the article carrier comprising:
    a pair of support rails adapted to be fixedly secured to a roof of said cab of said pickup truck;
    each of said support rails including a first portion having a length sufficient to extend along a portion of said roof, and a second portion extending toward a bed of said pickup truck;
    a cross member extending between said second portions at a position vertically below said roof of said cab portion; and
    a securing assembly associated with said cross member for engaging a portion of a bicycle to hold said bicycle in an upright position within the bed of said pickup truck.

8. The article carrier of claim 7, wherein said second portion extends generally perpendicularly from said first portion.

9. The article carrier of claim 7, wherein said securing assembly is clampingly engageable with said cross member.

10. The article carrier of claim 7, wherein said securing assembly is adapted to releasably engage a fork of said bicycle.

11. The article carrier of claim 7, wherein said support rails comprise tubular support rails.

12. The article carrier of claim 7, further comprising a cross bar adapted to be releasably secured between and to said first portions of said support rails for supporting articles above said roof of said pickup truck.

13. For a pick up truck, a pair of support rails for supporting articles over a roof of a cab of said pickup truck or adjacent a vertical wall portion of said cab, the support rails comprising:
   first longitudinal portions adapted to extend over a major portion of said roof to support articles above said roof;
   first mounting supports secured adjacent the first ends of said support rails for securing said first ends to said roof;
   second longitudinal portions extending generally perpendicularly from said first portions adjacent a vertical rear wall of said cab, for supporting articles at a point adjacent said vertical rear wall;
   a cross member extending between said second portions at a position vertically below said roof of said cab portion;
   at least one securing assembly supported on said cross bar for securing said articles to said cross bar; and
   second mounting supports secured to said second longitudinal portions.

14. The support rail of claim 13, wherein said support rail comprises a tubular support rail.

15. The support rail of claim 13, wherein said support rail comprises a single piece component.

16. The support rail of claim 13, wherein said support rail comprises a tubular aluminum rail.

17. A combination bicycle and article carrier for use with a pickup truck having a cab portion and a bed, said carrier comprising:
   a pair of support rails supported on a roof of said cab portion and each having a first portion and a second portion, said first portions extending along a major portion of a roof of said cab, and said second portions extending generally perpendicularly to said first portions along a vertical rear wall of said cab;
   a cross member extending between said second portions at a position vertically below said roof of said cab portion; and
   a securing assembly coupled to said cross member and adapted to engage a portion of a bicycle to hold said bicycle in an upright position within said bed.

18. The carrier of claim 17, further comprising a cross bar coupled between said first portions of said support rails for supporting articles thereon.

19. The carrier of claim 17, wherein said securing assembly is adapted to engage a fork of said bicycle.

20. The carrier of claim 17, wherein each said support rail comprises a single-piece, tubular component.

21. The carrier of claim 19, wherein said securing assembly comprises a clamping assembly for clamping onto said cross member.

* * * * *